(12) United States Patent
Yin et al.

(10) Patent No.: US 9,742,489 B2
(45) Date of Patent: Aug. 22, 2017

(54) SURVIVABLE HYBRID OPTICAL/ELECTRICAL DATA CENTER NETWORKS USING LOSS OF LIGHT DETECTION

(71) Applicant: NEC Laboratories America, Inc., Princeton, NJ (US)

(72) Inventors: Yawei Yin, Foster City, CA (US); Konstantinos Kanonakis, Dallas, TX (US); Philip Ji, Cranbury, NJ (US); Ting Wang, West Windsor, NJ (US); Shinya Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 16 days.

(21) Appl. No.: 14/961,236

(22) Filed: Dec. 7, 2015

(65) Prior Publication Data

US 2016/0204856 A1    Jul. 14, 2016

Related U.S. Application Data (60) Provisional application No. 62/101,091, filed on Jan. 8, 2015.

(51) Int. Cl.
| | |
|---|---|
| *H04B 10/038* | (2013.01) |
| *H04B 10/032* | (2013.01) |
| *H04B 10/079* | (2013.01) |
| *H04Q 11/00* | (2006.01) |

(52) U.S. Cl.
CPC ......... *H04B 10/038* (2013.01); *H04B 10/032* (2013.01); *H04B 10/0793* (2013.01); *H04B 10/0795* (2013.01); *H04B 10/07955* (2013.01); *H04Q 11/0005* (2013.01)

(58) Field of Classification Search
CPC ..................................... H04B 10/03–10/0799
USPC ........................................ 398/1–20, 45–57
See application file for complete search history.

(56) References Cited

U.S. PATENT DOCUMENTS

| | | | |
|---|---|---|---|
| 6,704,508 B1 * | 3/2004 | Asahi | H04J 14/0227 398/12 |
| 6,980,736 B1 * | 12/2005 | Fee | H04Q 11/0005 398/12 |
| 2004/0109687 A1 * | 6/2004 | Park | H04J 14/0227 398/57 |
| 2005/0185956 A1 * | 8/2005 | Emongkonchai | H04J 14/0295 398/17 |

(Continued)

OTHER PUBLICATIONS

Farrington et a, "Helios: A Hybrid Electrical/Optical Switch Architecture for Modular Data Centers", SIGCOMM'10, Aug. 30-Sep. 3, 2010, New Delhi, India, (12 pages).*

(Continued)

*Primary Examiner* — Li Liu
(74) *Attorney, Agent, or Firm* — Joseph Kolodka (57) ABSTRACT

Systems and methods are disclosed for data communication by forming a hybrid that includes an electrical switching network with packet granularity of switching and store-and-forward forwarding services to network traffic and an optical switching network providing circuit granularity of switching and optical bypassing services to network traffic; applying local control of optical switching modules in the optical switching network with a network controller coupled to the electrical switching network, the optical switching network, and a loss-of-light detection module; and detecting loss-of-light in a failure point in the optical switching network and rerouting traffic to avoid the optical failure point.

13 Claims, 8 Drawing Sheets

(56) References Cited

U.S. PATENT DOCUMENTS

| | | | | |
|---|---|---|---|---|
| 2006/0056843 A1* | 3/2006 | Fee | ............... | H04Q 11/0005 398/19 |
| 2008/0131124 A1* | 6/2008 | Nam | ............... | H04B 10/032 398/67 |
| 2009/0005085 A1* | 1/2009 | Das | ............... | H04W 76/027 455/460 |
| 2013/0108264 A1* | 5/2013 | deRuijter | ............ | H04Q 3/0083 398/45 |
| 2014/0337529 A1* | 11/2014 | Antony | ............... | H04L 45/22 709/226 |
| 2014/0362705 A1* | 12/2014 | Pan | ............... | H04L 47/125 370/237 |
| 2015/0043905 A1* | 2/2015 | Graves | ............... | H04Q 11/0005 398/25 |
| 2016/0037240 A1* | 2/2016 | Yang | ............... | H04Q 11/0005 398/45 |

OTHER PUBLICATIONS

Yu et al: "Enhancing Performance of Cloud Computing Data Center Networks by Hybrid Switching Architecture", Journal of Lightwave Technology, vol. 32, No. 10, May 15, 2014, pp. 1991-1998.*

Wang et al, c-Through: Part-time Optics in Data Centers, SIGCOMM'10, Aug. 30-Sep. 3, 2010, New Delhi, India.

Farrington et al, Helios: A Hybrid Electrical/Optical Switch Architecture for Modular Data Centers, SIGCOMM'10, Aug. 30-Sep. 3, 2010, New Delhi, India.

Odile Liboiron-Ladouceur et al, The Data Vortex Optical Packet Switched Interconnection Network, Journal of Lightwave Technology, vol. 26, No. 13, July 1, 2008.

Yawei Yin, Lions: An AWGR-Based Low-Latency Optical Switch for High-Performance Computing and Data Centers IEEE Journal of Selected Topics in Quantum Electronics, vol. 19, No. 2, Mar./Apr. 2013.

Kang Xi, Petabit Optical Switch for Data Center Networks, Jan. 2013; DOI: 10.1007/978-1-4614-4630-9_8.

Philip N. Ji, Optically Interconnected Data Center Using Software-Defined Networking Technology, 2013 18th OptoElectronics and Communications Conference held jointly with 2013 International Conference on Photonics in Switching.

Ankit Singla, Proteus: A Topology Malleable Data Center Network, 2010 ACM 978-1-4503-0409-2/10/10.

* cited by examiner

SURVIVABLE HYBRID OPTICAL/ELECTRICAL DATA CENTER NETWORKS USING LOSS OF LIGHT DETECTION

This application claims priority to Provisional Application 62/101,091 filed Jan. 8, 2015, the content of which is incorporated by reference.

BACKGROUND

The present application is related to survivable hybrid optical/electrical data center networks using loss of light detection.

Following the trend of upgrading electrical cables and transceivers to optical fiber cables and transceivers, data center networks (DCNs) are transitioning from all-electrical networks to hybrid electrical/optical networks or all optical networks. However, conventional systems do not address the survivability issues in DCNs appropriately. Generally speaking, the multi-stage distributed architectures with a lot of equal-cost paths between end hosts are more robust to network failures and can provide alternative routes when one or more link/node fails. On the other hand, the single stage architectures rely on a single device or components to accomplish the switching task, therefore they are more vulnerable to network failures (if the switching device fails, the whole network fails). Another aspect of the survivability issue is failure detection. In the all-electrical DCNs, failure detection is intrinsic, since each electrical transceiver either has the capability of detecting port/link failures or can be programmed to do so. While in the optical DCNs, whether it is the all-optical DCNs or the optical embodiment of the hybrid DCNs, the optical switches providing the traffic bypassing capabilities (i.e. any electrical processing is bypassed) in the network are not capable of detecting link or port failures, simply because the "loss-of-light" event cannot be detected until the signals reach the end optical receivers. One reason that the current optical switches do not want to detect the "loss-of-light" event is that such detection causes the additional loss of optical power, while the major optimization goal of an optical switch is to minimize the insertion loss. Therefore, any tapping-off of the optical power for detection purpose was not considered.

SUMMARY

In one aspect, systems and methods are disclosed for data communication by forming a hybrid that includes an electrical switching network with packet granularity of switching and store-and-forward forwarding services to network traffic and an optical switching network providing circuit granularity of switching and optical bypassing services to network traffic; applying local control of optical switching modules in the optical switching network with a network controller coupled to the electrical switching network, the optical switching network, and a loss-of-light detection module; and detecting loss-of-light in a failure point in the optical switching network and rerouting traffic to avoid the optical failure point.

In another aspect, a system with optical switches with loss-of-light detection functionalities in optical data center networks and other similar networks includes an electrical switching network with packet granularity of switching and store-and-forward forwarding services to network traffic; a loss-of-light detection module coupled to the optical switching network to detect an optical failure point at each optical switching hop; and a network controller coupled to the electrical switching network, the optical switching network, and loss-of-light detection module, the network controller receiving failure data using network control protocol messages and reroutes traffic to avoid the optical failure point.

Advantages of the system may include one or more of the following. The system enhances network survivability by enabling the optically switched network to detect optical failures at each hop and alert the network controller without losing the optical transparency brought by the optical switching modules. The system enhances network survivability by locating and isolating one or multiple failure points in the optical network and allows the network controller to reroute traffic around the failure point(s). The network manager can quickly recover the network from the failure point(s). failure detection (or fault monitoring) in the all-optical DCNs or in the optical part of hybrid optical/electrical DCNs. With the enhanced failure detection capability in each optical switch in the network, the survivability of the network can be significantly improved since the traffic affected by the failure can be quickly rerouted. Furthermore, since the devices/components at fault can be quickly identified and isolated, the overall recovery time in the network can also significantly reduced.

DESCRIPTION

Figure 1:
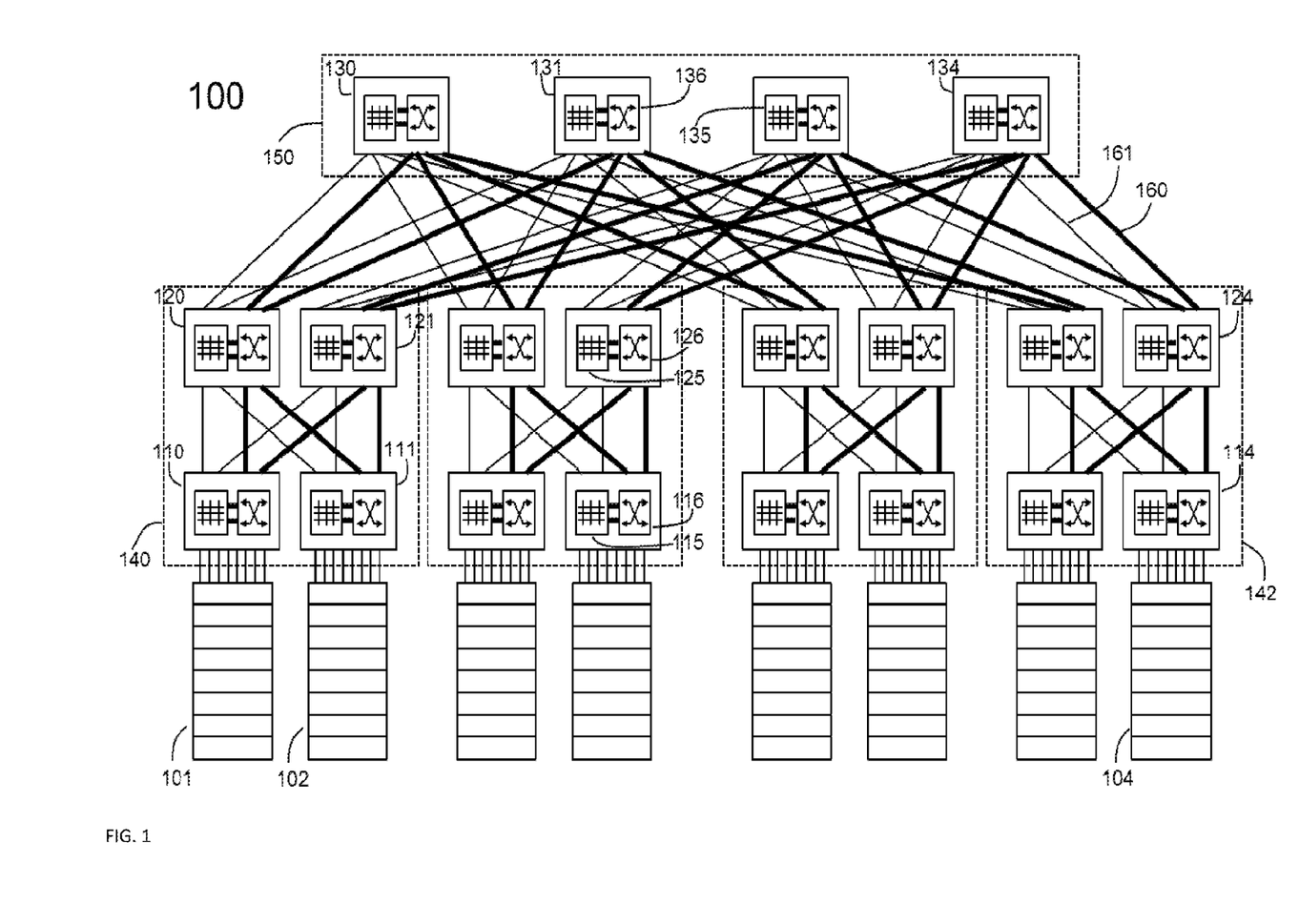
FIG. 1 shows an exemplary hybrid data center network architecture with electrical and optical switches.

FIG. 1 shows an exemplary hybrid data center network architecture with electrical and optical switches. A hybrid optical/electrical data center network (as illustrated in FIG. 1, 100) consists of server racks (101, 102, 104), top of rack (TOR) switches (110, 111, 114), aggregation switches (120, 121, 124), and core switches (130, 131, 134). The aggregation switches are sometime called pod switches, where a pod (140, 142) is a group of server racks which are fully connected through the pod switches. The core switches are sometime called the spine switches, or the spine layer (150) switches. The switches in all these different layers of the FatTree based DCN have an identical internal structure. They consist of an electrical switching fabric (115, 125, 135) and an optical switching fabric (116, 126, 136), and these two fabrics can be connected inside the switches in any layer. The electrical switching fabric has the packet switching capability and therefore can support the statistical multiplexing when sharing bandwidth resources among packets in the time domain. The optical switching fabrics are relatively slow in switch reconfiguration speed, but can typically support higher bandwidth at each input/output port and are transparent to link bit-rate and modulation format. Therefore the optical switches can support circuit switching at high bandwidth. The server traffic can be aggregated in the electrical switches and enter the optical switching domain and benefit from the optical bypassing capabilities thereafter. The benefits of optical bypassing includes, but are not limited to, zero store and forward delay, large bandwidth, low power consumption, etc. The high bandwidth optical links connected to the optical switching ports are depicted as thick lines (160) and the electrical links (or low speed optical links) connected to the electrical switching ports are depicted as thin lines (161) in FIG. 1.

The system focuses on enhancing the survivability of the optical networks in data centers or other similar environments. The system adds loss-of-light detection functionality to existing optical switching devices and components, and applies such enhanced optical switching devices and components to optical data center networks and other similar network architectures. The new network with the loss-of-light detection functionality can detect optical failures at each optical switching hop, and therefore be able to report such failures to the network controller using commonly available network control protocol messages. The network controller will then be able to reroute the traffic to avoid the failure point, locate and isolate the failure point in the network, and trigger an alarm for recovering the failure in a timely fashion.

Figure 2:
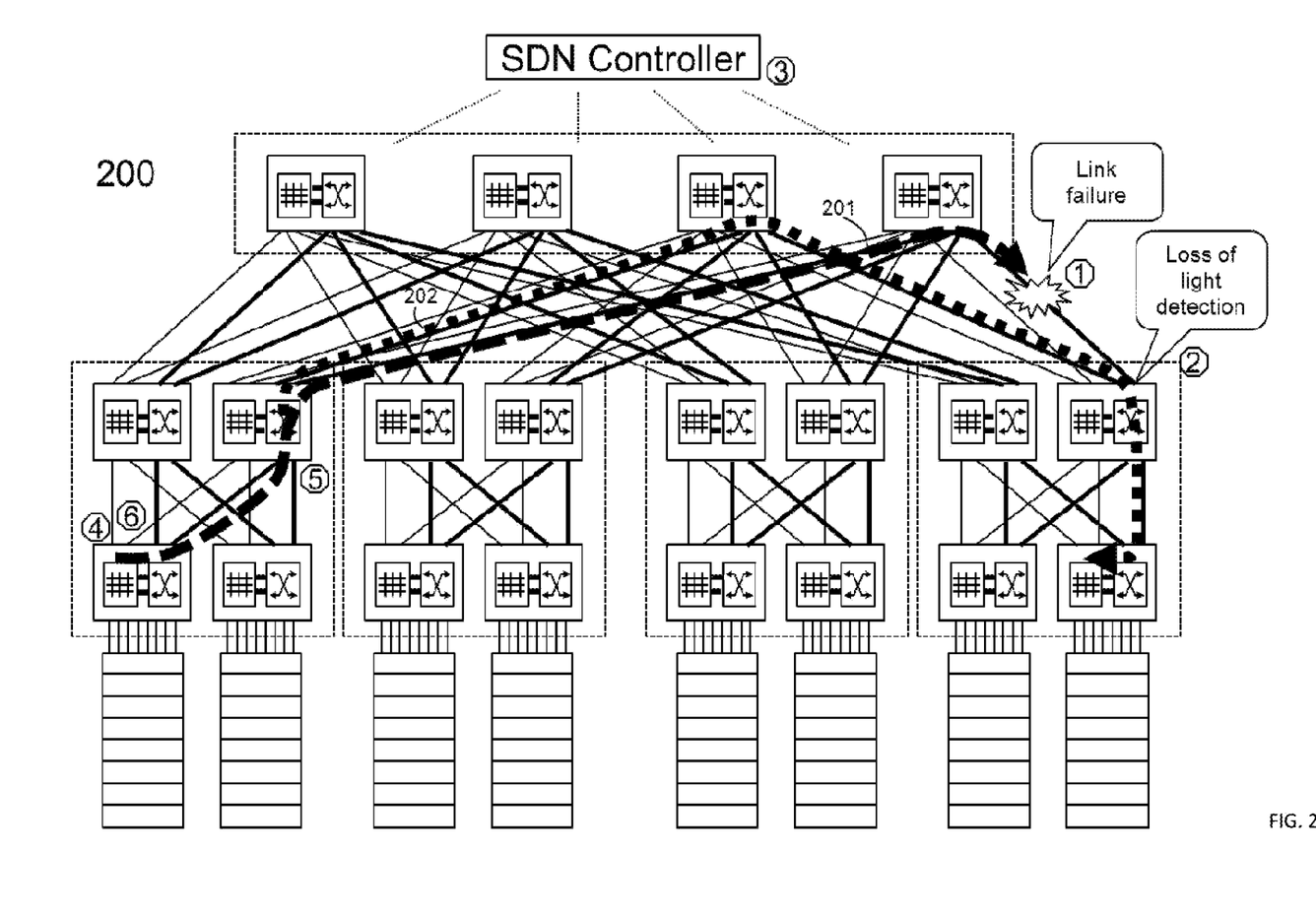
FIG. 2 shows an exemplary link-fault handling procedure in the hybrid DCN network with loss-of-light detection capable optical switches.

FIG. 2 shows an example (200) of a typical network operation procedure when link failure happens in the optical switching domain. As shown in step 1, when link failure (e.g. a fiber cut) happens, the optical switch with loss-of-light detection modules in the downstream of the failed link (201) can sense the signal loss (step 2) and notify the network controller (step 3) in FIG. 2. As an example, the downstream node shown in FIG. 2 is the optical switch in the aggregation layer, it can also be the optical switch in the core (spine) layer if the optical link is bi-directional. In fact, in an established optical path, a link failure event can trigger the loss-of-light detection in all the cascaded optical switches in the downstream until the end node (i.e. the optical to electrical converter). Therefore, when a link failure happens in the middle of a light path (i.e. there are multiple optical hops in the downstream), the SDN controller can receive multiple loss-of-light signals. In this case, the SDN controller needs to decide which one is the "first fault", and notifies all the downstream switches of the "first fault" switch. Since the controller has all the information about the current established path (201) in the network, it is clear that, among all the switches who have reported loss-of-light, the "first fault" is the far-most switch to the end of the light path. The "first fault" switches need to react to the fault while other switches just need to reset their corresponding ports in the previous light path to prepare for a new connection. The Finite State Machine (FSM) which determines the reaction of the optical switches to the faults is described later in this embodiment. Besides notifying the downstream optical switches, the SDN controller also need to notify the sender the presence of the link failure and ask the transmitter to temporarily stop transmitting data (step 4), calculate an alternative route (202) if there is any (this operation can be omitted if the affected light path were a protected one, which means its protection route is already calculated), and reconfigure the optical switches in the alternative paths (step 5). After the new light path is successfully established, the transmitter can be activated again to send out the traffic (step 6).

Figure 3:
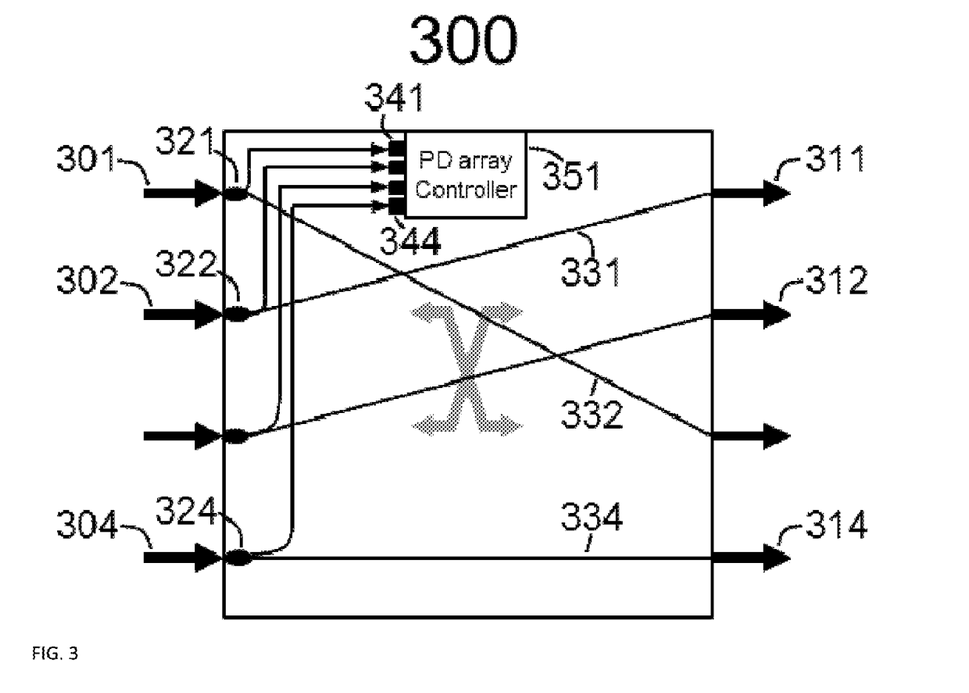
FIG. 3 shows an exemplary architecture of optical switch with loss-of-light detection capabilities.

There are different possible types of architecture which could enable the loss-of-light detection capability in optical switches. Three of them and their corresponding FSM in handling the failure event are described next. The first node architecture (300) is shown in FIG. 3. In this architecture, the optical power at each input port (301, 302, 304) is tapped off by optical splitters (321, 322, 324) or other tapping components by an insignificant amount which is just enough to trigger its corresponding photodetector (PD) (341, 344). There is one PD for each input port. The PD array is controlled by the PD-array controller (351) which can be integrated with the switch local controller. The PD array and the controller are responsible of identifying the loss-of-light triggering condition and report to the SDN controller of such situations. The rest majority part of the optical power will traverse the established optical cross-connections (331,332, 334) inside the optical switch and reach their destination output ports (311, 312, 314). The solid lines (331, 332, 334) represent the cross-connections inside the optical switch are just an example of one instantaneous switching state and can be changed when traffic and/or routing solution changes.

Figure 4:
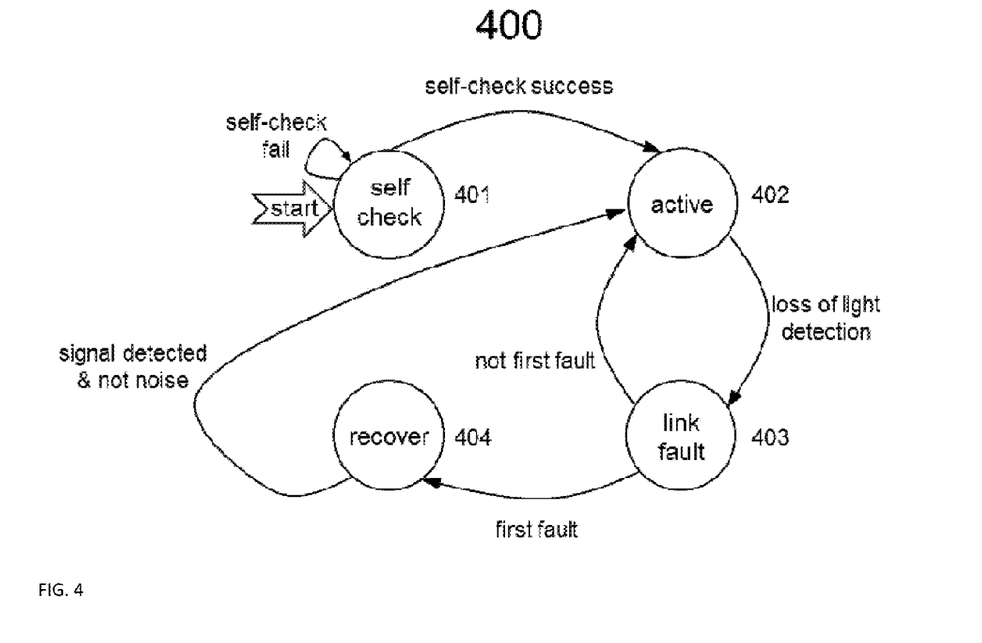
FIG. 4 shows an exemplary FSM of the optical switch architecture shown in FIG. 3.

In case of a failure event, the FSM (400) of the node architecture shown in FIG. 3 is illustrated in FIG. 4. After power up, the optical switch enters the "self-check" state (401) automatically and checks all its ports to see if they are functioning properly. If the self-check fails, the switch sends a signal to the network control and management plane, stays in the self-check state and waits for the management team to repair or replace itself. If the self-check succeeds, the switch enters the "active" state (402), notifies the network controller about its current state, and is ready for accepting the incoming traffic. The optical port connection map will be configured and changed by the SDN controller in real time according to the traffic matrix (or traffic matrix estimation). Whenever there are optical paths going through the current switch, the corresponding input port, together with its PD, will receive the incoming optical power. If the optical power is lost before the controller tears down the optical light path (i.e. traffic flow finishes), the loss-of-light event is detected, and the switch enters the "link fault" state (403). As mentioned before, since all the downstream switches after the failure point will lose optical power simultaneously, only the first switch in the downstream will react to the failure and therefore enter the "recover" state (404) and notify the network controller. The other switches in the downstream will return to the "active" state (402) and will be ready to accept new traffic on the corresponding ports (which are now released as a result of the fault event in the upstream). In the "recover" state, the switch will wait for the fault to be fixed, and after which the PD of the corresponding input port will start to detect optical power again. After the switch confirms that this newly detected signal is not noise (e.g. wait for a stabilization circle), it will return to the "active" state (402) after notifying the SDN controller.

In this switch architecture in FIG. 3, the loss-of-light detection is only able to detect the fault in upstream links, while not being able to differentiate a fiber link failure from a node failure. If the loss of optical power is caused by a partial node failure in the upstream, manual intervention may be required to identify the failure and notify the SDN controller. The node architecture that can identify both link failures and node failures are illustrated in FIG. 5.

Figure 5:
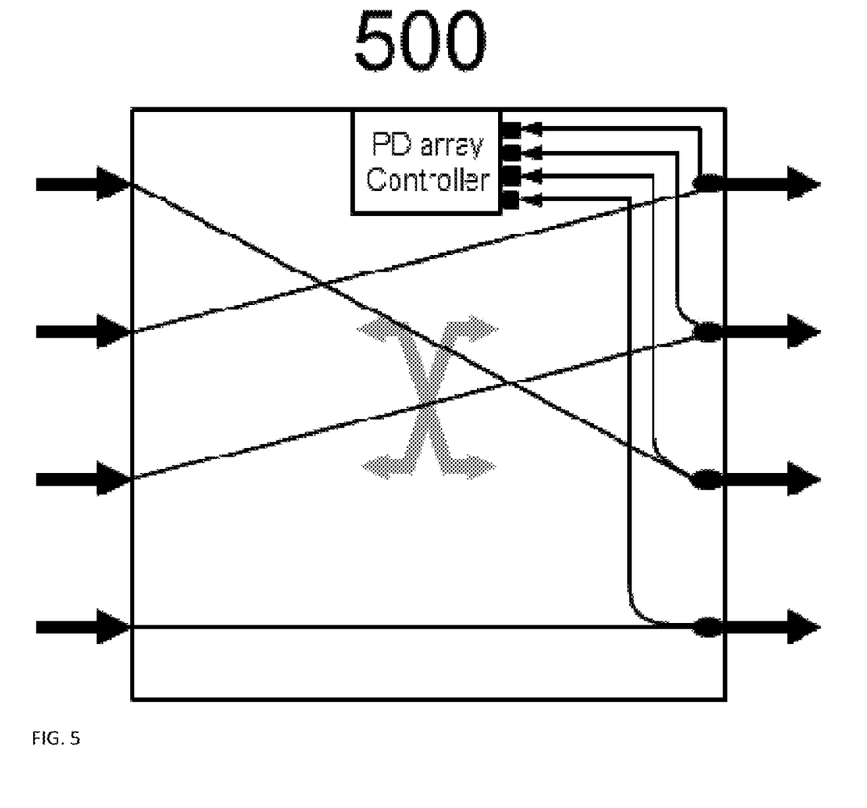
FIG. 5 shows an exemplary architecture of optical switch with loss-of-light detection capabilities.
Figure 6:
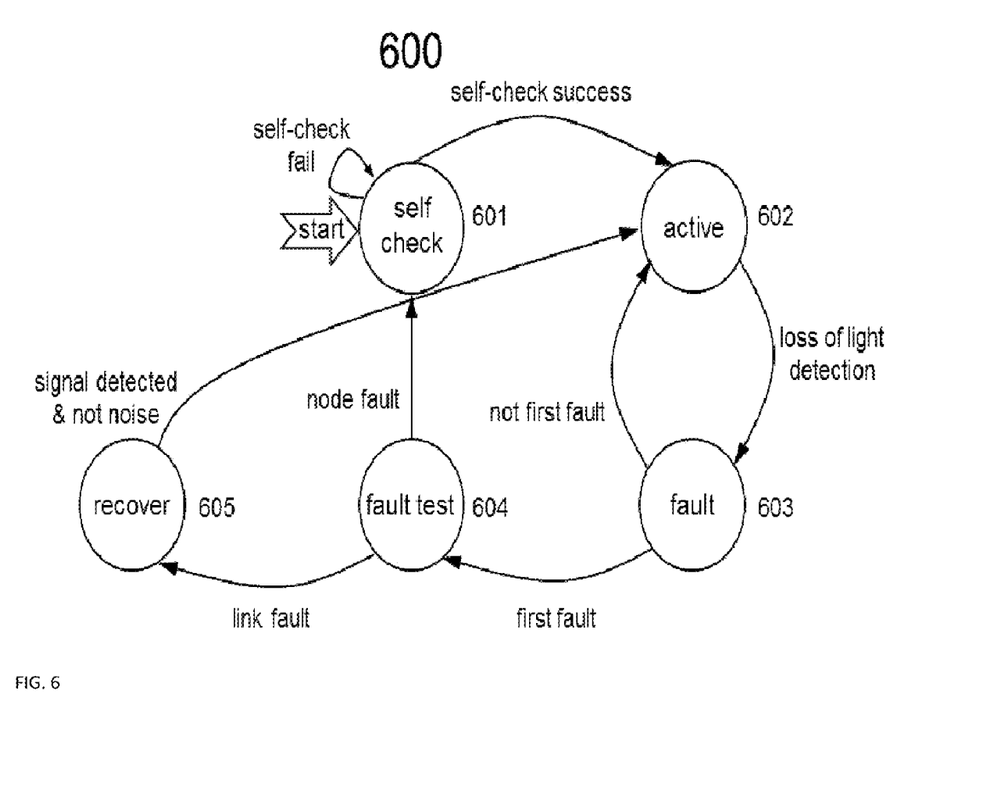
FIG. 6 shows an exemplary FSM of the optical switch architecture shown in FIG. 5.

The second optical switch architecture (500) that will be discussed in the present invention is shown in FIG. 5. The only difference between the second architecture (500) and the first architecture (300) is that the optical power in the second architecture (500) is tapped off at the output ports of the switch, rather than the input ports. The optical signals have already gone through the optical cross-connect matrix (e.g. the mirror matrix in the MEMS switch) before going to the PD array. However, in order to identify the node failure in case of a loss-of-light even, the switch need to go through a more complicated FSM, as shown in FIG. 6 (600). The initial states of "self-check" (601) and "active" (602) are the same as in FIG. 4 (401, 402). After detecting the loss-of-light signal, the optical switch transfers from the "active" state (602) to the "fault" state (603). In the "fault" state, if the switch is identified by the controller as the first switch after the failure point (first fault), then it transfers to the "fault test" state (604), otherwise it transfers back to the "active" state (602) and releases the ports occupied by the previous failed optical path. In the "fault test" state, the optical switch uses its internal testing schemes to fault-test the corresponding port pair which receives the loss-of-light signal. If the self-test fails, it means the loss-of-light was triggered by internal node failure, and then the FSM of the switch transfers to the "self-check" state (601), signals the SDN controller to reroute all the traffic going through this switch and then wait in the "self-check" state for the node repair or replacement. On the other hand, if the switch passed the fault-test on the corresponding port pair, it will transfer to the "recover" state (605) since the loss-of-light signal must come from the link failure from the upstream optical fiber links. The switch in the "recover" state will continue to function as normal except for the fact that the input port affected by the failed link will not receive any input optical power, but the output port in the port pair can still accept traffic routed from other input ports of the switch. The FSM will switch to the "active" mode again after the link failure is recovered and new signal is detected at the previously affected input port.

Figure 7:
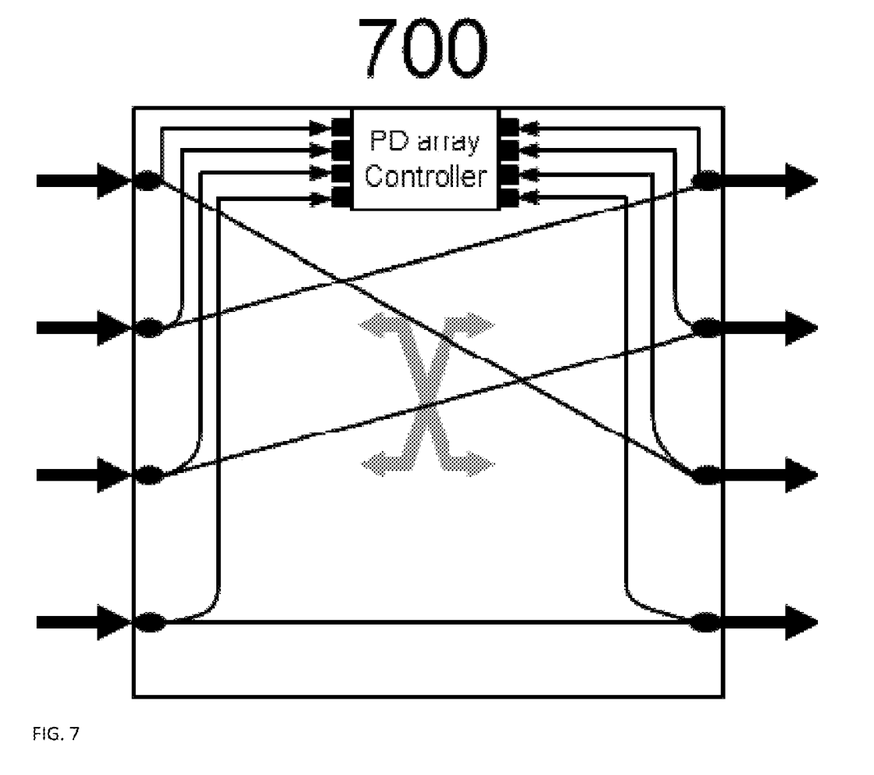
FIG. 7 shows an exemplary architecture of optical switch with loss-of-light detection capabilities.

A third optical switch architecture is shown in FIG. 7 (700). The differentiation between 700 and the architectures of 300 and 500 is that both input ports and output ports in 700 are equipped with optical splitters or other power tapping components. Therefore, the architecture of 700 can automatically tell whether the loss of light detection comes from the internal node failure or the external link failure. If the first-fault switch node detects the loss-of-light signal both at the input port's PD and the output port's PD, then the failure must come from the external upstream links. On the other hand, if the first-fault switch node only detects the loss-of-light signal at the output port's PD, then the failure must come from the internal of the optical switch node. There will not be the case that only the input port's PD detects the loss-of-light signal while the output port's PD still detects optical signal, since if the external upstream link fails and the input port does not receive any optical power, there will not be any output power at the connected output port either.

Figure 8:
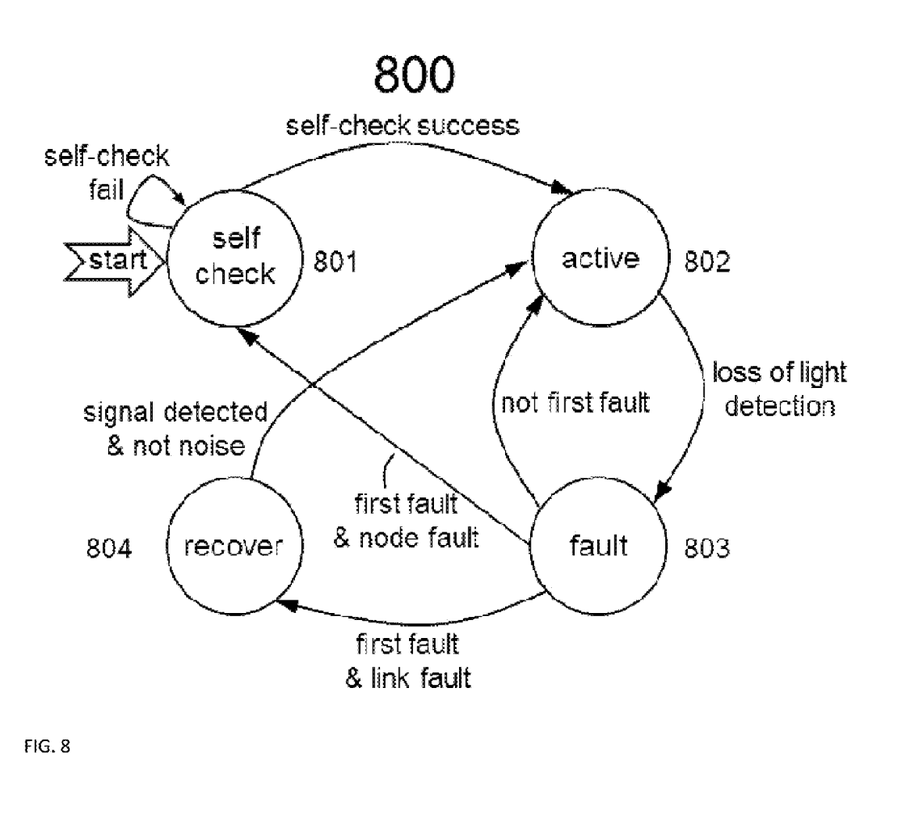
FIG. 8 shows an exemplary FSM of the optical switch architecture shown in FIG. 7.

The benefit of using more PDs in the architecture 700 is that it can have a simpler FSM (800), as shown in FIG. 8. Since when failure happens, the switch can automatically differentiate the node fault from link fault, the "fault test" (604) in FSM 600 can be omitted. The FSM 800 goes directly from fault state (803) to "self-check" state (801) if the fault is the "first fault" and also a "node fault", and then wait there for node repair or replacement. On the other hand, the FSM 800 goes directly from "fault" state (803) to "recover" state (804) if the "first fault" is also a "link fault"

The switch node architecture 700 results in increased CAPEX (capital expenditure) when using more PDs in the optical switch and the OPEX (operational expenditure) increase due to the increase power loss at each switch node, since optical power is tapped off at both input ports and output ports for loss-of-light detection purpose.

The three switch architectures with loss-of-light detect functionality are just two examples of all the possible architectures. The present invention is not restricted to the exact implementation details presented in the two switch architectures and their corresponding FSMs. The system enables benefits with the use of the loss-of-light detection modules, components and methods to detect and handle link or node failures in the optical network. Such benefits improve the survivability of the optical networks. The present invention adds the loss-of-light detection functionality to existing optical switching devices and components, and applies such enhanced optical switching devices and components to optical data center networks and other similar network architectures. The new network with the loss-of-light detection functionality will be able to detect optical failures at each optical switching hop, and therefore be able to report such failures to the network controller using commonly available network control protocol messages. The network controller will then be able to reroute the traffic to avoid the failure point, locate and isolate the failure point in the network, and trigger an alarm for recovering the failure in a timely fashion.

The diagnostics include electronic loopback and one-way path tests. These tests are used to verify channel attenuation and predict link margin by reducing transmit power until the BER exceeds a specified level.

Network management computers are notified of component or link failures, or when the system is operating inefficiently. Typically, these messages are known as alerts or traps and are implemented using an appropriate protocol such as SNMP.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system for reliable data communication, comprising:
    an electrical switching network with packet granularity of switching and store-and-forward forwarding services to network traffic;
    an optical switching network providing circuit granularity of switching and optical bypassing services to network traffic,
    wherein the electrical and optical switching networks comprise distributed and multi-hop data communication; and
    a loss-of-light detection module coupled to the optical switching network to detect an optical failure point at each optical switching hop;
    a network controller coupled to the electrical switching network, the optical switching network, and loss-of-light detection module, the network controller receiving failure data using network control protocol messages and reroutes traffic to avoid the optical failure point; and
    a finite state machine (FSM) to detect failure,
    wherein in case of a failure, after power up, the FSM places the optical switching network components in a self-check state and checks all port functionality and if the self-check fails, the optical switching network components send a signal to the network controller, stay in the self-check state and wait for repair or replacement, and if the self-check succeeds, the optical switching network components enter an active state, and an optical port connection map is configured and changed by the network controller in real time according to a traffic matrix or traffic matrix estimation, and if loss-of-light event is detected, the optical switching network components enter fault state, wherein the network controller locates and isolates the failure point in the network, and triggers an alarm for recovering from the failure within a predetermined period.

2. The system of claim 1, wherein the network comprises server racks, top of rack (TOR) switches, aggregation switches, and core switches.

3. The system of claim 1, comprising switches in a FatTree based DCN with an electrical switching fabric and an optical switching fabric connected inside the switches in any layer.

4. The system of claim 1, wherein optical power at each input port is tapped off by optical splitters for a predetermined amount sufficient to trigger a photodetector (PD) at each input port, wherein the PD and a PD-array controller are responsible of identifying the loss-of-light triggering condition and report failures.

5. The system of claim 1, wherein optical power is tapped off at output ports of the switch rather than input ports.

6. The system of claim 1, wherein the switch passes a fault-test on a corresponding port pair and transfers to a recover state as a loss-of-light signal is caused by a link failure from upstream optical fiber links.

7. The system of claim 1, wherein both input ports and output ports are equipped with optical splitters or power tapping components to detect whether the loss of light detection comes from an internal node failure or an external link failure.

8. A method for data communication, comprising:
    forming a hybrid that includes an electrical switching network with packet granularity of switching and store-and-forward forwarding services to network traffic and an optical switching network providing circuit granularity of switching and optical bypassing services to network traffic, wherein the electrical and optical switching networks comprise distributed and multi-hop data communication; and
    positioning loss-of-light detection modules in optical switches of the optical network to detect an optical failure point at each optical switching hop;
    applying local control of optical switching modules in the optical switching network with a network controller coupled to the electrical switching network, the optical switching network, and a loss-of-light detection module, wherein the network controller receiving failure data using network control protocol message;
    detecting loss-of-light in a failure point in the optical switching network and rerouting traffic to avoid the optical failure point; and
    handling a link or node failure point in the optical switching network with one or more finite state machines,
    wherein in case of a failure, after power up, placing optical switching network components in a self-check state and checking all port functionality and if the self-check fails, the optical switching network components send a signal to the network controller, stay in the self-check state and wait for repair or replacement, and if the self-check succeeds, the optical switching network components enter an active state, and an optical port connection map is configured and changed by the network controller in real time according to a traffic matrix or traffic matrix estimation, and if loss-of-light event is detected, the optical switching network components enter fault state,
    wherein the network controller locates and isolates the failure point in the network, and triggers an alarm for recovering from the failure within a predetermined period.

9. The method of claim 8, comprising aggregating server traffic with electrical switches and entering an optical switching domain providing optical bypassing.

10. The method of claim 8, comprising receiving multiple loss-of-light signals and determining a switch with a first fault, and notifying downstream switches of the first fault switch.

11. The method of claim 10, wherein the first fault switch is a far-most switch to a light path end.

12. The method of claim 10, wherein the first fault switch handle the fault while other switches reset corresponding ports in a previous light path to prepare for a new connection.

13. The method of claim 8, wherein a switch passes a fault-test on a corresponding port pair and transfers to a recover state as a loss-of-light signal is caused by a link failure from upstream optical fiber links.

* * * * *